June 24, 1930.  A. MOORE  1,766,673
PROCESS OF PREPARING CHARGES FOR COMBUSTION IN INTERNAL COMBUSTION ENGINES
Filed Dec. 13, 1926   3 Sheets-Sheet 1
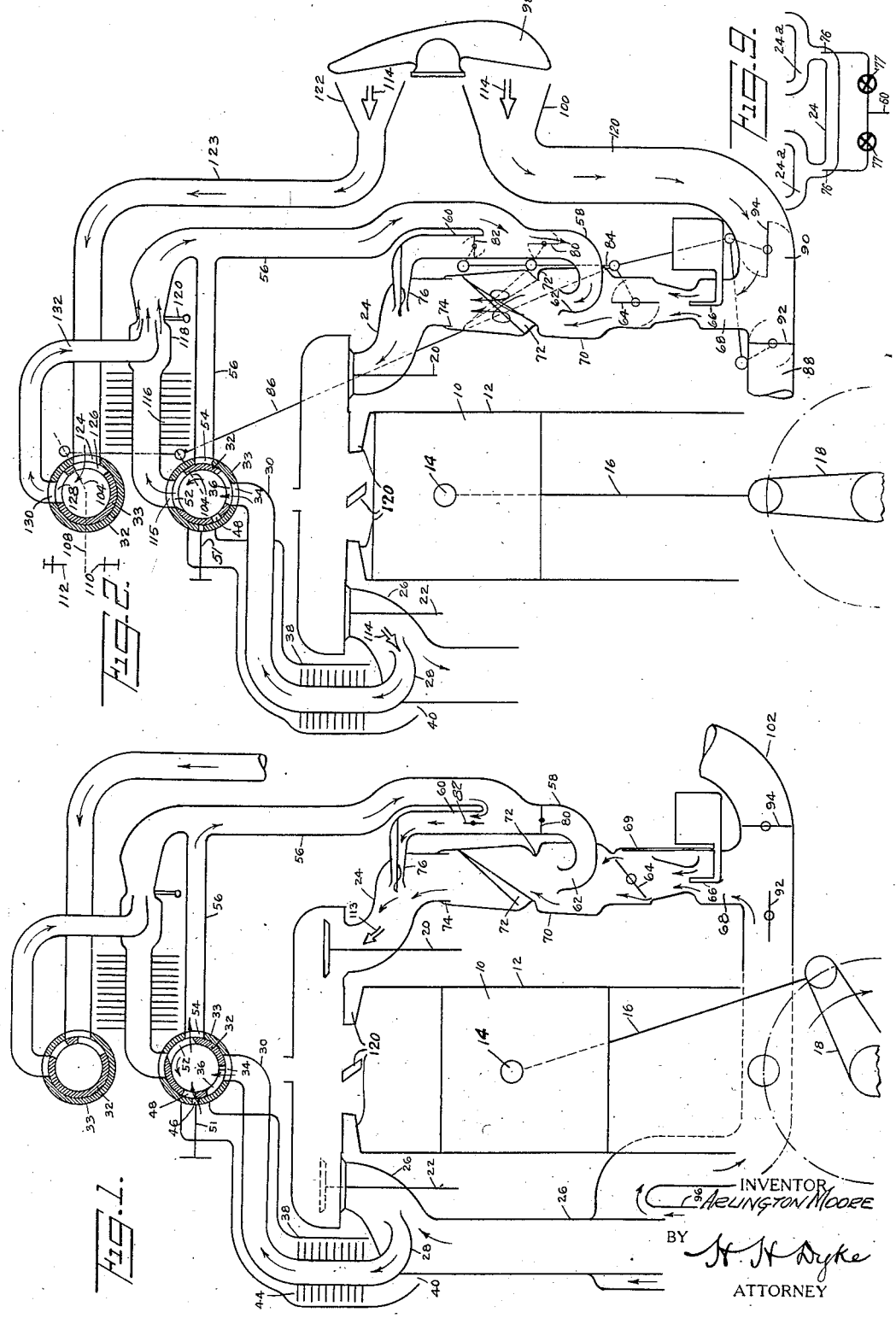

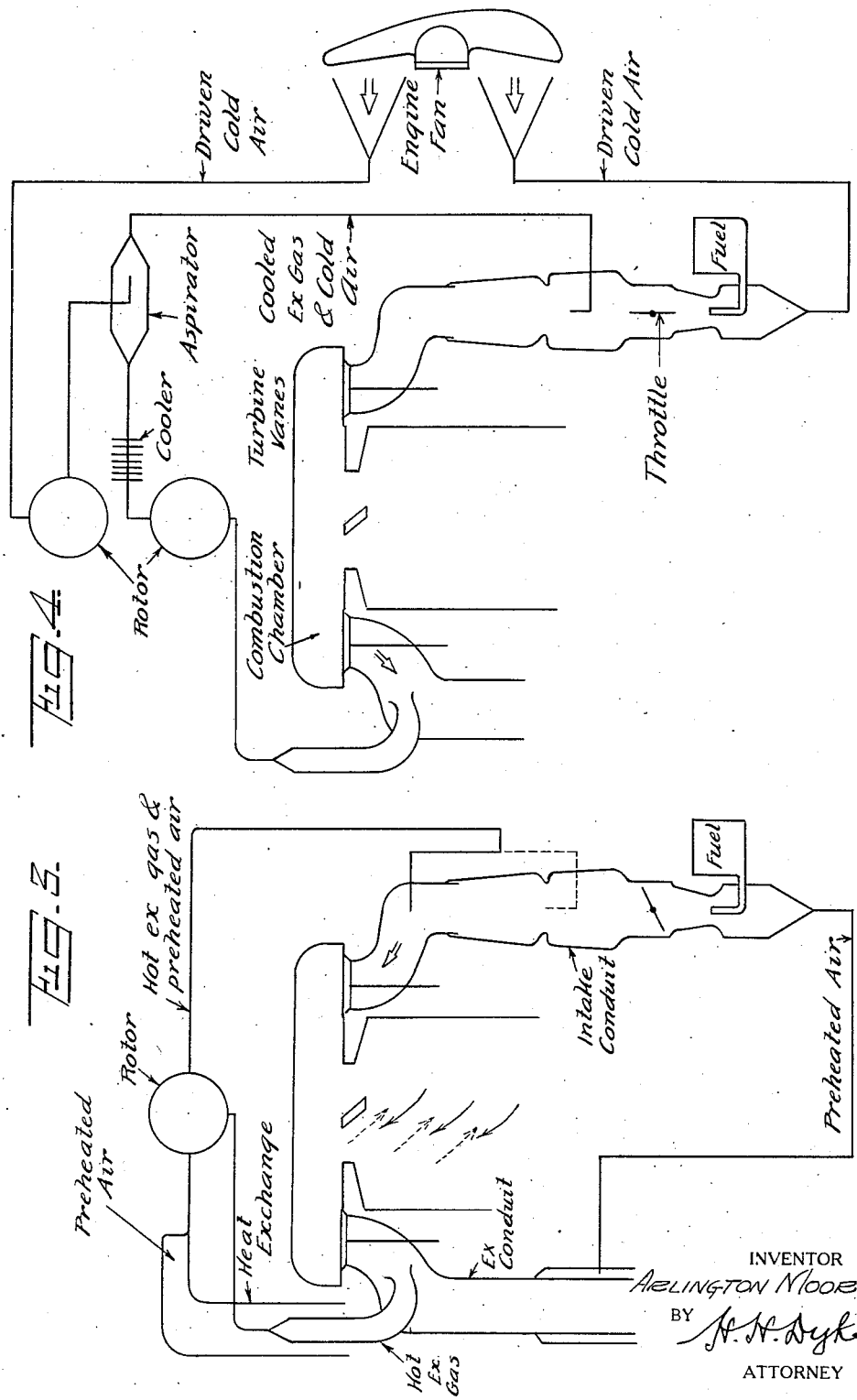

June 24, 1930.   A. MOORE   1,766,673
PROCESS OF PREPARING CHARGES FOR COMBUSTION IN INTERNAL COMBUSTION ENGINES
Filed Dec. 13, 1926   3 Sheets-Sheet 3
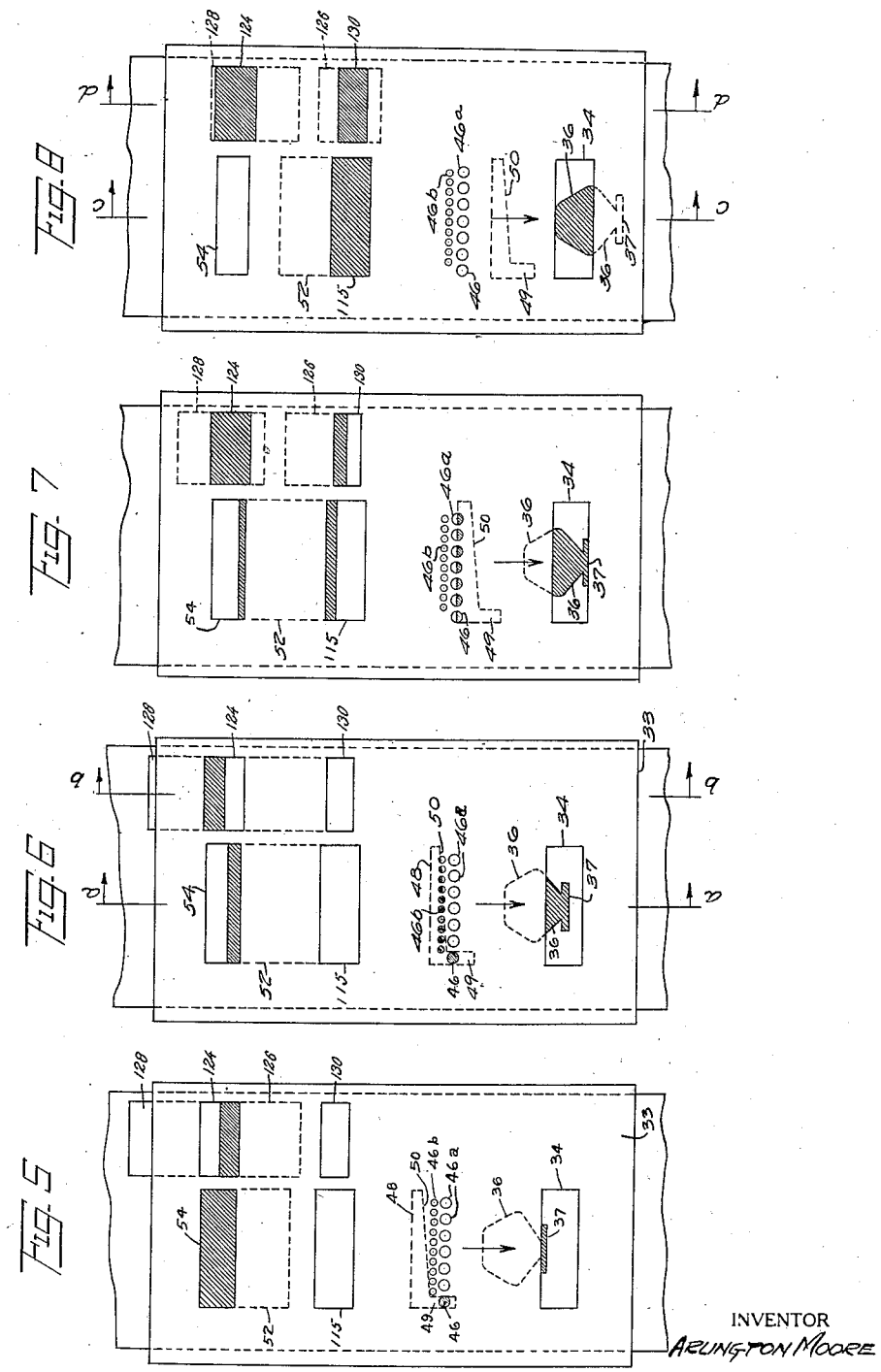
INVENTOR
ARLINGTON MOORE
BY
H. H. Dyke
ATTORNEY Patented June 24, 1930

1,766,673

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

PROCESS OF PREPARING CHARGES FOR COMBUSTION IN INTERNAL-COMBUSTION ENGINES

Application filed December 13, 1926. Serial No. 154,345.

My invention is of a process of forming charges for combustion in internal combustion engines, and is particularly applicable to four-cycle engines, such as automobile, truck and airplane engines, using light liquid fuel, of which so-called gasoline is a typical present-day example. My process may be practiced by means of apparatus installed as accessory equipment for existing engines, or by means of apparatus which is inbuilt.

Object

The principal object of my invention is the provision of a process whereby the power characteristics of the Otto cycle are beneficially modified to increase the ratio of mean effective pressure to maximum pressure, with resultant increase of thermal efficiency and betterment of engine performance in power and smoothness, whereby detonation and preignition are avoided with use of gasoline or other substantial equivalent liquid fuel which need not contain anti-detonation dopes, and this even in engines with compression ratio of around 6:1 or higher, thus making such engines available for practical use; a gain in fuel economy is secured; crankcase dilution is substantially eliminated; and practically complete combustion secured with freedom from carbon deposits and substantially complete elimination of carbon monoxide from the engine exhaust.

General statement

With this object in view my improved process may be described in general terms as comprising the preparation of charge material for combustion in the engine cylinders by delivery of exhaust gases of the engine and air above the engine throttle into direct admixture with the fuel and air stream from the carburetor, the exhaust gases and additional air being supplied in proportions and quantities automatically metered and at temperatures and pressures automatically regulated adjunctively to engine throttling throughout the idling and power ranges of engine operation.

By another part of my process, which may be dispensed with, especially when my process is carried out with accessory equipment on old engines, but is preferably to be included, I put the gases entering the cylinder on the intake stroke into a state of violent agitation and admixture with the unscavenged gases of the prior cycle, and violently agitate the confined gases on the compression stroke so that, when the charge is ignited towards the end of the compression stroke, they are in a state of violent agitation and substantially homogeneous admixture adapted, upon ignition, to rapidly spread the flame throughout all parts of the combustion chamber and to secure substantially complete combustion.

Formation of fuel and air stream

My process begins with the admixing of liquid fuel with an air stream. Available commercial carburetors can be used for this purpose, or the carburetor may be constructed with its metering characteristics especially adapted for use with the other steps of my process. The throttle is preferably located in the usual place, that is in the carburetor at its point of connection to the intake manifold, and is used by the operator for throttling the fuel and air stream on its way to the engine cylinders.

Commercially available carburetors are designed for the taking of all charge material therethrough and through the throttle opening. With my process, which includes introduction of part of the charge material above the throttle, it is desirable, when using such carburetors, to reduce the air of the fuel and air stream in order to permit introduction of a part of the total air for cylinder charging above the throttle while still supplying the proper quantity of fuel, and this notwithstanding the reduced suction on the jet due to admission of charge material above the throttle. I, therefore, preferably reduce the size of the air passage or the throat of the Venturi tube surrounding the fuel jet so that while the volume of air passing the jet is lessened as compared with ordinary carburetor practice, the velocity of the air and consequently its capacity to pick up fuel is increased, and the fuel is effectively pulverized.

The mere reduction of the size of the air passage produces the necessary air velocity for picking up fuel, so long as the intake depression, notwithstanding reduction by admission of gases above the throttle, is relatively considerable, but as the throttle is further opened and intake depression is lessened it becomes desirable to make provision for keeping up the air velocity past the fuel jet in order to ensure the requisite fuel supply. I preferably make such provision by forcibly driving the air at such times toward the carburetor air inlet. As is explained below in connection with heat supply, this driven air is preferably cold or atmospheric air, while the air supplied to the carburetor by suction alone at low partial throttle openings is preferably preheated.

Use of exhaust gas

Introduction of the exhaust gases of the engine into the cylinder charges to reduce detonation has heretofore been proposed, but so far as I am aware, has never been put into commercial use in engines operated on gasoline or equivalent liquid fuel. However, I make no claim broadly to their use, but claim same only in connection with the other features of my process, which are essential in order to make use of exhaust gas for this purpose practicable. The exhaust gases of an engine operated in accordance with my process are particularly well adapted for preventing detonation, as they are practically entirely inert, except for a small oxygen percentage, and their carbon oxide is practically entirely the dioxide, with none, or no more than traces, of the monoxide. The exhaust gas is supplied with the driving force of the main exhaust gas stream behind it, as by taking it from the main exhaust gas stream through an impact tube having its mouth exposed against the flow of the exhaust gas stream, and the supply thereof is automatically metered, adjunctively to the engine throttling, throughout the idling and power ranges of engine operation.

Additional air supplied with exhaust gas

The exhaust gas has a diluent effect, and with nothing more than its inclusion, loss of power would result, particularly at and near full engine loads. I supply air with the exhaust gas, which air is likewise automatically metered, and by so increasing the oxygen concentration, and this oxygen uniting with the fuel, I compensate or more than compensate for the diluent effect of the inert exhaust gas. For convenience of expression I call this balancing the exhaust gas with the additional air supply. At times of relatively dense cylinder charging, this additional air is preferably supplied with pressure behind it as pointed out hereafter, so that, while still maintaining the desired balance, the quantity of inert exhaust gas which can be added to the charge can be increased as additional air is supplied. Thus a supply of exhaust gas sufficient to prevent detonation is made available at the times when most needed for this purpose.

The additional gases introduced above the throttle

The addition of exhaust gas and air into the charge material is carried out so as to reduce intake depression and to increase the initial charge pressure over that obtainable when all the charge material is supplied by engine suction through the carburetor. This is accomplished by putting in the exhaust gas and air through the intake manifold system at a point or points between the throttle and the engine cylinders, utilizing the depression in the intake manifold as the principal source of energy for obtaining a supply of the exhaust gas and air when the intake manifold pressure is sufficiently lower than atmospheric, and, when the pressure in the intake manifold approaches nearer to atmospheric, making use with such intake depression as is available, of the pressure and kinetic energy of the exhaust gases, not only to drive the exhaust gases themselves toward the intake manifold and cylinders, but also to aspirate air and supply same with the exhaust gases. Furthermore, the pressure and kinetic energy of moving air is preferably used to assist in cylinder charging, as by collecting the air, to be aspirated by the exhaust gas, with a funnel exposed to the blast of the engine fan or to wind velocity produced by the movement of the automotive device, as automobile, airplane, etc. The increased initial cylinder pressure so obtained gives a substantial increase of power, and the decrease in intake depression so obtained increases available power by cutting down the pumping losses. I direct the delivery of the mixture of exhaust gas and air into the intake conduit in the direction of flow therein, and so avoid any back pressure or blowing out through openings in the carburetor or elsewhere, and furthermore, when the throttle is relatively wide open and intake depression is low, by so directing the delivery of the additional gases, I promote the movement of fuel-laden air through the carburetor. At times of substantially full cylinder charging I preferably deliver the blast of exhaust gas and air to the intake conduit near the throttle and in the direction of flow of the fuel and air stream from the carburetor. I am thus enabled to secure thorough admixture of such gases with the fuel-air stream prior to delivery to the engine cylinders. For partial cylinder charging, however, which does not require so thorough mixing, while preferably delivering a part of these additional gases near the throttle, I preferably deliver at least the major portion thereof more nearly direct to the engine cylinders, as by admitting same near the inlet valve ports through nozzles pointed in the direction of flow and preferably located in the branches of the intake manifold.

Heat supply

I also supply heat to the charge, and do this very effectively by the direct and preferably central admixture of hot gases with the fuel and air stream from the carburetor. The availability of exhaust gas at high temperatures enables the heat of the gases introduced above the throttle to be controlled simply and effectively. I control this readily available heat supply so that, for light engine loads during the lower ranges of throttle opening, when the cylinder charges are of relatively low density, the fuel is not merely gasified but the temperature of the charge is greatly raised, though not so high as to cause chemical change or be productive of spontaneous ignition upon compression. The balancing air supplied at such times with the hot exhaust gas is preheated by heat exchange with the exhaust gas. The two stage delivery of the mixture of hot exhaust gases and preheated air into direct admixture with the fuel-air stream during times of low density cylinder charging, first, near the throttle, and second, near the intake valve ports are well adapted to produce highly effective gasification of the fuel and material raising of the charge temperature. At such times I also preferably augment the delivery of heat to the charge by supplying hot air to the carburetor.

During the approach to maximum engine loads, when the cylinders are more densely charged and volumetric efficiency is of moment, I reduce the heat supply to such an extent, that while the heat supplied is sufficient for fully vaporizing the fuel, substantial rise of charge temperature and resulting loss of volumetric efficiency is avoided. The air admitted through the carburetor at such times is preferably cold air forcibly driven toward the carburetor air inlet to increase its velocity and capacity for fuel lifting. The excess heat of the exhaust gases is radiated away and/or reduced by mixing cold air with the exhaust gases, and the blast of exhaust gas and air delivered to the intake near the carburetor has time to become thoroughly admixed with the fuel and air stream from the carburetor as they traverse the intake conduit together, during which time the absorption of heat by the fuel being vaporized still further reduces the temperature of the exhaust gas. The cooling of the exhaust gases during periods of dense cylinder charging increases their capacity to eliminate detonation, which would occur only at such times.

Metering of additional gases

The metering of the exhaust gas and air and the variation of heat supply and of utilization of pressure and/or kinetic energy for the various purposes, which have been described, are controlled adjunctively to the engine throttling, thus making their control automatic and dispensing completely with any special manual manipulation, which would require so much attention and present so many difficulties of operation under the varying conditions to which engines of automotive devices, and particularly automobile engines, are subjected, as to be unacceptable for practical use.

Ignition timing

With the use of the inert exhaust gas in the charge material, I am enabled to extend the period of combustion and increase mean effective pressure by advancing the time of ignition to around 30 to 40 degrees ahead of top center, without causing detonation or preignition.

Agitation in the engine cylinder

In addition to the forming of charge material as described prior to the charges entering the engine cylinder, I preferably make provision for producing substantially the maximum possible agitation of the gases at all times from the entry of the gases past the intake valve up to the time of their combustion. This may be accomplished in various ways, one way being to provide substantially turbine or vane-like members in the combustion chamber arranged at an angle to set the gases whirling in cyclonic movement in one direction as the piston moves down on the intake stroke and in the opposite direction as the piston moves upwardly on the compression stroke.

While I believe that the high turbulence of the confined gases and the presence of the turbine vanes are of benefit in yet other ways not altogether understood, I have three principal purposes in setting the confined gases into agitation and keeping them agitated: first, to complete the thorough admixing and homogenizing of all parts of the charge material including fuel and gaseous components, second, to obtain a thorough admixing with the charge material of the unscavenged gases of the prior cycle, which are themselves in a state of rapid circulation and turbulence at the time of entry of the charge material for the next cycle, and third, to secure at the time of ignition such rapid movement, such complete homogeneity of charge material, and uniformity of heat distribution throughout the confined body of charge material as to mechanically spread the flame therethrough as rapidly as possible and secure substantially uniform and complete combustion. When this feature of my process is included, a somewhat later ignition timing than that set forth above is recommended to secure the optimum mean effective pressure and power. With its inclusion a substantial further increase in compression ratio is possible without detonation or preignition, provided distribution to the various engine cylinders is substantially uniform.

In the accompanying drawings Figs. 1 and 2 are diagrammatical views indicating the carrying out of my process, Fig. 1 being for partial throttle openings and Fig. 2 for wide open throttle. The single rotary valve and its sleeve are shown dissected in Figs. 1 and 2 into two parts for convenience of illustration. The valve rotor section shown uppermost in Fig. 1 is on line $a$—$a$ and the lowermost section on line $b$—$b$ of Fig. 6, and the similar sections in Fig. 2 on lines $c$—$c$ and $d$—$d$ respectively of Fig. 8. Figs 3 and 4 are diagrammatical views generally similar to Figs. 1 and 2, but with a simplified line showing and elimination of parts which are temporarily not functioning. Figs. 5, 6, 7 and 8 are unrolled or development views of the valve sleeve and rotor, showing port relations at various rotor positions. Fig. 5 shows such relations for idling. Fig. 6 shows port relations for low part throttle and corresponds to Figs. 1 and 3. Fig. 7 shows the relations for approximately half open throttle, and Fig. 8 for full throttle, Fig. 8 corresponding to Figs. 2 and 4. Fig. 9 is a diagrammatical view showing distribution of additional gases to the branches of the intake conduit.

Reference character 10 indicates a piston of an internal combustion engine reciprocating in a cylinder 12, 14 the wrist pin, 16 the connecting rod and 18 the crankshaft. The engine indicated is of the T-head type containing intake valves 20 and exhaust valves 22, but the valves may be arranged in various ways, the type shown being selected merely as lending itself to convenient illustration. The intake conduit is indicated at 24 and the exhaust conduit at 26. An impact tube 28 in the exhaust conduit 26 has its open mouth exposed against the flow of the exhaust gas therein. Hot exhaust gas entering the impact tube 28 passes through pipe 30 to the rotary valve 32 turning in sleeve 33, its flow being controlled by extent of registration of sleeve port 34 with valve port 36. Extent of port registration is indicated by cross-hatched lines on Figs. 4–8. At engine idling, only the narrow, elongated portion 37 of port 36 registers with sleeve port 34. See Fig. 5.

A heat exchange device, for preheating air for admixture with the exhaust gas, supplied through pipe 30, is indicated at 38, the air being taken in at 40 after being warmed by the exhaust manifold 26 and heated by exposure to exhaust gas conduit 30, provided with heat radiating fins 44. The preheated air passes through holes 46, 46$^a$ and 46$^b$ in the sleeve 33, the quantity passed being controlled by degree of registration of metering valve port 48 therewith. Valve port 48 comprises an advanced slot portion 49 adapted to register with hole 46 at idling, and the forward edge 50 of port 48 is slanted to gradually uncover first the small series of holes 46$^b$ and then the series of larger holes 46$^a$ in sleeve 33. Supply of preheated air for idling is adjusted by the screw needle valve 51 by which the extent of opening of hole 46 in the sleeve 33 is regulated. At low part throttle openings (Figs. 1 and 3) the mixture of hot exhaust gas and preheated air leaves the valve 32 through valve port 52 and sleeve port 54 leading to conduit 56, which preferably has two branches 58, 60. Branch 58 leads to nozzle 62 located relatively closely over the throttle 64 and directed in the direction of flow of the fuel and air stream coming through the carburetor, which may be of various constructions and makes, but always comprises a source of fuel 66 and of atomizing air 68, and preferably comprises a small duct 69 for supplying fuel above the throttle for idling. The intake conduit is preferably enlarged about nozzle 62, as at 70, and provided with spiral or rifled vanes 72 to produce agitation and thorough mixing, and to divert back to the stream passage any liquid fuel lodging on these vanes. Liquid fuel adhering to the passage walls is also turned back and into the stream by the downwardly directed flange or thimble 74 at the junction of the enlarged part 70 with the principal portion of intake manifold 24.

Branch 60 of conduit 56 terminates in preferably a plurality of nozzles 76, by which the mixture of gases from rotary valve 32 are delivered to intake manifold 24 in the direction of stream flow relatively closely to the ports of intake valves 20. A desirable arrangement for a four-cycle engine, for example, is as indicated in Fig. 9, in which there is one of the nozzles 76 for each of branches 24$^a$ of the intake conduit leading to the several pairs of cylinders, and cocks 77 are provided to regulate distribution to the several intake conduit branches and cylinder pairs and to correct irregularities of distribution arising from engine design and manifold construction. The selective delivery of gases at 62 or 76 is controlled by the two interlinked butterfly valves 80, 82 connected by link 84 to move with the throttle 64, which is also linked to valve 32 by link 86. At the low partial throttle position of Fig. 1, butterfly valve 80 leading to nozzle 62 is closed or nearly closed, whereas valve 82 leading to nozzles 76 is practically wide open, thus delivering all or the major part of the mixture of hot exhaust gas and preheated air at nozzles 76 and none or only a small part at 62. Should either of nozzles 62 or 76 be dispensed with (and also butterfly valves 80, 82), as may be done, I prefer to retain the nozzle 62, dispensing with nozzles 76. When my system is installed as an accessory and the engine construction is such that it is inconvenient to make a connection closely over the throttle, the use of branch connections alone may be resorted to.

The carburetor air inlet 68 is preferably branched at 88, 90 and its branches provided with butterfly valves 92, 94 interlinked with one another and with throttle 64, so that valve 92 is open at and near closed throttle and valve 94 is closed. The air supplied through valve 92 for engine operation at low throttle openings is preferably heated, as by means of the stove 96 surrounding a part of the exhaust pipe 26. Valve 94 opens and valve 92 closes as the throttle is turned toward its opened position, and when valve 94 opens, air is forcibly driven toward the carburetor by any available driving device, such as the engine fan 98, the air being collected by funnel 100 and delivered with the driving force of the fan 98 behind it through pipe 102. In this way, air is supplied through the carburetor at and near open throttle with additional velocity and resulting in additional capacity for lifting fuel. The crank 104 (or its extension 108) moves between adjustable stops 110, 112, whereby the valve rotor may be adjusted relative to its sleeve for varying its scope of movement and for closely regulating the degree of opening of the portion 37 of the hot exhaust gas port 36 for engine idling. With the throttle opening about as indicated in Fig. 1, or a less opening, the energy for intake of gaseous fluids is principally supplied by the suction of the piston on the intake stroke, as indicated by heavy arrow 113 on Fig. 1.

At and near wide open throttle the situation is as shown in Figs. 2 and 4: The intake depression is relatively low and the available sources of energy for driving charging material in are resorted to for supplementing what suction is available, as is indicated by heavy arrows 114 on Fig. 2. The preheated air port 48 is closed and consequently the heat interchange apparatus 38 does not function. Port 54 is also closed. Exhaust gas only enters valve 32 through port 36 and passes out through port 52 registering with sleeve port 115 to the cooler 116, by which the exhaust gas is cooled. After passing cooler 116, cold air is aspirated at 118, thus further cooling the exhaust gas, and the mixture of cooled exhaust gas and cold air passes through branch 58 of conduit 56 and past the open butterfly valve 80 to the intake conduit by nozzle 62. The suction at the aspirator 118 may be utilized in part for any suitable purpose, such as lifting fuel from a low level supply tank. A connection to the throat of the aspirating Venturi tube for such purpose is indicated at 120. Unlike fuel lifting suction devices connected to the intake over the throttle, the suction connection 120 is most efficient at times when the throttle is open. The cold air is driven by fan 98 into funnel 122, passes through pipe 123 and into the valve rotor 32 by sleeve port 124 and valve port 126 and out through valve port 128 and sleeve port 130 and through conduit 132 to the aspirator 118, whence the mixture of cooled exhaust gas and cold air is delivered to the intake conduit 24, this time passing in only through nozzle 62, the butterfly valve 82 to branch 60 being closed, and the butterfly valve 80 being substantially wide open. In this way the exhaust gas is cooled by the cooler, further cooled by the aspiration and mixture of cold air therewith, and finally still further cooled in giving up its heat to vaporize the fuel.

The port arrangements are such as to obtain a gradual transition from the conditions for low density cylinder charging illustrated in Figs. 1, 3, 5 and 6 to those for providing cylinder charges of higher density and illustrated in Figs. 2, 4 and 8. Fig. 7 shows the port positions at one stage of the transitory period in which the passage 54 leading direct to the engine cylinders and passage 115 leading thereto indirectly through the cooler 116 and aspirator 118 are partially open simultaneously.

By providing the plural inclined vanes 120 radially projecting from the cylinder block around the mouth of the cylinder bore 12, or other equivalent way, I produce a rotary or cyclonic movement of the exhaust gases on the exhaust or scavenging stroke, and of the entering charge material on the intake stroke as the piston descends, and a reverse movement on the compression stroke as the piston ascends, and as the ignition takes place before the compression stroke is fully complete, the confined and compressed gases when ignited are in a high state of agitation, thoroughly homogenized and admixed with unscavenged gases remaining in the cylinder from the preceding cycle, and with their heat substantially uniformly distributed, which conditions are those adapted for highly rapid spread of the flame and for substantially complete and uniform combustion.

In this way I effectually supplement within the engine cylinders the beneficial effects of forming charges outside the cylinders best suited for the various ranges of engine operation, and furthermore, while such irregular formation of the combustion chamber may be productive of carbon accumulation in an engine not operated with my process of charge forming outside the cylinders, this objection does not arise with the use of my process which prevents the accumulation of carbon deposits.

It will be observed that the provision of vane members, such as described, affords a convenient way of reducing the clearance space and at the same time increasing the surface area for cooling. While the vanes may be water cooled, they are preferably made solid with plenty of metal to conduct heat to the walls and when so formed they give up their heat rapidly to the incoming charge. When the installation is of the accessory sort, the vanes may be separately installed as by being formed on an inserted ring or the like.

My process will be readily understood from the foregoing and from the diagrammatical showing of Figs. 3 and 4, which brings out in sharp contrast the manner in which I meet the differing requirements for engine operation at light loads, at which automobile engines, for example, are operated almost entirely, and at or near full load.

When running an ordinary internal combustion engine, as an automobile engine, for example, at light loads, the initial cylinder pressure is considerably below atmospheric, there is a considerable pumping loss by the piston working against the almost closed throttle, the charge material with which the cylinders are filled is of low density, and the conditions generally are such that the engine operation will be greatly helped by increase in cylinder content and by a generous heat supply. At such times, as is clearly brought out by Fig. 3, I supply to the engine intake above the throttle a mixture of hot exhaust gas and preheated air and also preferably admit heated air to the carburetor, thus cutting down the pumping loss and avoiding presence of wet fuel in the manifold and cylinder and increasing both the initial cylinder pressure and temperature.

When the engine is being operated at or near full loads the situation is altogether different and the requirements are for relatively high density of cylinder charge with no more heat than is necessary to vaporize the charge, and inert gas, instead of merely being useful to bring up the charge density, as at light loads, is desirable in fairly considerable proportions to prevent detonation. I meet this situation, as indicated in Fig. 3, by cooling the exhaust gas with a radiation cooler, again cooling it with cold air aspirated therewith, and finally by admixing the cooled exhaust gas and air with the fuel and air stream near the throttle, and by driving in a stream of cold air to the carburetor. I also supplement the preparation of the charges outside the cylinder by putting them into and keeping them in a state of thorough agitation and complete admixture from the time they enter the cylinder up to and during combustion.

The essential characteristics of the Otto or constant volume cycle are materially modified by my process. The delivery of gases in addition to the fuel and air stream through the carburetor has raised all points of the suction stroke with a resulting increase in the initial pressure, that is pressure at the beginning of the compression stroke. The compression line too is of very much higher absolute unit pressures than under standard Otto cycle performance. Due to the quantity of inert gases present it is necessary to advance the time of ignition. Except at very low engine speeds, timing of the ignition at about 30°–40° ahead of top center is necessary to obtain the optimum benefit in increase of mean effective pressure. It is upon the power and expansion stroke, however, that the most notable changes have been wrought. The outstanding feature with my process is the marked higher unit pressure throughout the power stroke with resulting much higher mean effective pressure and increased thermal efficiency. An increase in the ratio of mean effective pressure to maximum pressure takes place in a most desirable degree, resulting in a much smoother type of combustion, which becomes quite apparent in automobile practice in the substantial absence of noticeable torque reaction.

Exhaust gas analyses of the exhaust gas generally from the exhaust conduit and from individual cylinders, without and with my process for purposes of comparison, show that a much more complete type of combustion is obtained with my process, practically total absence of carbon monoxide, and improved distribution to the individual cylinders.

In general, the compression pressure, or pressure measured at top center without igniting the charge in the cylinder or cylinders taken for measurement, varies, for a given engine speed, substantially directly with the density of cylinder charging and with extent of opening into the intake conduit through the passage controlled by the throttle and the meter controlled passage above the throttle, and while, with delivery of part of the charge material above the throttle, the range from lowest charge density and corresponding compression pressure to the highest density of charge and compression pressure corresponding thereto is reduced, as compared with engines taking all the charge material through the carburetor, there is nevertheless quite a considerable range of pressure difference. Inasmuch as the compression pressures can be easily determined under various running conditions, I prefer to make use thereof in my claims as a sort of measuring stick for the range of operating conditions from lowest density cylinder charging, producing minimum power, up to the highest density cylinder charging and practically maximum power output.

It will be apparent that my process can be performed with use of apparatus of various kinds, of which that diagrammatically indicated herein is merely illustrative, and that constructional limitations are not imposed, but the process of my invention is of the scope defined in the following claims by which I intend to cover all that is novel over the prior art.

This application is in part a continuation of my application, Serial No. 64522, filed October 24, 1925, and of my application, Serial No. 85,450, filed February 2, 1926, Renewed September 10, 1929.

I claim:

1. The process of forming charges for internal combustion engines, which comprises admixing liquid fuel with an air stream, throttling the fuel and air stream on its way to the engine cylinders, taking exhaust gas from the main exhaust gas stream with the driving force of the main exhaust gas stream behind it, admixing additional air with the exhaust gas, and adjunctively to throttling metering the exhaust gas and additional air and controlling the admission of the additional air with the exhaust gas to provide hot air for cylinder charges of low density and cold air for cylinder charges of relatively higher density.

2. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream after it has passed the point of throttling, and metering the exhaust gas and additional air while supplying during the lower ranges of compression pressure heat sufficient to gasify the fuel and to raise the charge temperature to a point below self-ignition upon compression, and, during the higher ranges of compression pressure at which volumetric efficiency is of moment, reducing the heat supply sufficiently to avoid substantial loss of volumetric efficiency.

3. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream in the direction of flow of said stream and after it has passed the point of throttling, and metering the exhaust gas and additional air while supplying during the lower ranges of compression pressure heat sufficient to gasify the fuel and to raise the charge temperature to a point below self-ignition upon compression, and; during the higher ranges of compression pressure at which volumetric efficiency is of moment, cooling the exhaust gas and aspirating cold air therewith, and thereby reducing the heat supply sufficiently to avoid substantial loss of volumetric efficiency.

4. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream in the direction of flow of said stream and after it has passed the point of throttling, and metering the exhaust gas and additional air while supplying during the lower ranges of compression pressure heat sufficient to gasify the fuel and to raise the charge temperature to a point below self-ignition upon compression, and; during the higher ranges of compression pressure at which volumetric efficiency is of moment, cooling the exhaust gas and aspirating cold air therewith, while driving in the air to be aspirated, and thereby reducing the heat supply sufficiently to avoid substantial loss of volumetric efficiency.

5. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream after it has passed the point of throttling, and metering the exhaust gas and additional air while supplying during the lower ranges of compression pressure heat sufficient to gasify the fuel and to raise the charge temperature to a point below self-ignition upon compression, and; during the higher ranges of compression pressure at which volumetric efficiency is of moment, reducing the heat supply sufficiently to avoid substantial loss of volumetric efficiency, putting the charge material into violent agitation and admixture with the unscavenged gases of a prior cycle during intake into the engine cylinder, further violently agitating the confined gases during the compression stroke, and igniting at such time ahead of the completion of the compression stroke as will produce substantially maximum mean effective pressure without detonation or preignition.

6. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream after it has passed the point of throttling, and metering the exhaust gas and additional air while supplying during the lower ranges of compression pressure the exhaust gas hot and the additional air preheated, and; during the higher ranges of compression pressure at which volumetric efficiency is of moment, cooling the exhaust gas and supplying the additional air cold.

7. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream after it has passed the point of throttling, and metering the exhaust gas and additional air while supplying during the lower ranges of compression pressure the air for the fuel and air stream hot, the exhaust gas hot, and the additional air hot, and; during the higher ranges of compression pressure at which volumetric efficiency is of moment, supplying the air for the fuel and air stream cold, the exhaust gas cooled, and the additional air cold.

8. The process of preparing charges for combustion in internal combustion engines throughout their range of compression pressures, which comprises admixing fuel with an air stream, throttling the air stream on its way to the engine cylinders, delivering exhaust gas of the engine and additional air into direct admixture with said fuel-air stream after it has passed the point of throttling, and metering the exhaust gas and additional air while supplying during the lower ranges of compression pressure the air for the fuel and air stream hot, the exhaust gas hot, and the additional air hot, and; during the higher ranges of compression pressure at which volumetric efficiency is of moment, supplying the air for the fuel and air stream cold, the exhaust gas cooled, and the additional air cold, using the cooled exhaust gas with the driving force of the principal exhaust gas stream behind it to aspirate the cold air, and forcibly driving in the cold air to be aspirated.

9. The process of forming charges for internal combustion engines throughout their range of compression pressures, which comprises admixing fuel with an air stream, throttling the fuel and air stream on its way to the engine cylinders, delivering exhaust gas of the engine and additional air into direct admixture with the fuel and air stream in the direction of its flow and after it has passed the point of throttling, and, adjunctively to throttling: metering the exhaust gas and additional air while supplying therewith and with the original air stream during the lower ranges of compression pressure heat sufficient to gasify the fuel and to raise the charge temperature to a point below self-ignition upon compression and making the admixture of exhaust gas and additional air with the air stream relatively close to the engine cylinders, and; during the higher ranges of compression pressure at which volumetric efficiency is of moment, driving in cold air to supply the air of the fuel and air stream, driving in the exhaust gas with the driving force of the main exhaust gas stream behind it, cooling the exhaust gas, aspirating cold air with the exhaust gas, driving in the cold air to be aspirated and making the admixture of exhaust gas and cold air with the fuel-air stream relatively close to the point of throttling and remote from the engine cylinders.

10. The process of forming charges for internal combustion engines throughout their range of compression pressures, which comprises admixing fuel with an air stream, throttling the fuel and air stream on its way to the engine cylinders, delivering exhaust gas of the engine and additional air into direct admixture with the fuel and air stream in the direction of its flow and after it has passed the point of throttling, and, adjunctively to throttling: metering the exhaust gas and additional air while supplying therewith and with the first named air stream during the lower ranges of compression pressures heat sufficient to gasify the fuel and to raise the charge temperature to a point below self-ignition upon compression and making the admixture of exhaust gas and additional air with the fuel and air stream in part relatively close to delivery to the engine cylinders, and in part relatively close to the throttle and remote from the engine cylinders, and; during the higher ranges of compression pressures at which volumetric efficiency is of moment, driving in cold air to supply the air for the fuel and air stream, driving in the exhaust gas with the driving force of the main exhaust gas stream behind it, cooling the exhaust gas, aspirating cold air with the exhaust gas, driving in the cold air to be aspirated and making the admixture of exhaust gas and cold air with the fuel-air stream relatively close to the throttle and remote from the engine cylinders.

11. The process of preparing charges for combustion in an internal combustion engine throughout its range of compression pressures, which comprises mixing fuel with an air stream, throttling the fuel and air stream on its way to the engine cylinders and delivering into direct admixture with the fuel and air stream, after it has passed the throttling point, a mixture of exhaust gas of the engine and additional air which is of relatively high temperature for cylinder charges of relatively low compression pressure and of relatively low temperature for cylinder charges of relatively high compression pressure.

12. The process of preparing charges for combustion in an internal combustion engine throughout its range of compression pressure, which comprises mixing fuel with an air stream in proportions to form a fuel and air stream relatively rich in fuel, throttling the fuel and air stream on its way to the engine cylinders, and delivering into direct admixture with the fuel and air stream, after it has passed the throttling point, a mixture of the exhaust gases of the engine and additional air sufficient to compensate for the richness of the fuel and air mixture, which mixture supplied beyond the throttling point is of relatively high temperatures for cylinder charges of relatively low compression pressures and is of relatively low temperatures for cylinder charges of relatively high compression pressures.

13. The process of preparing charges for combustion in an internal combustion engine throughout its range of cylinder charge quantities, which comprises mixing fuel with an air stream, directly admixing with said fuel-air stream on its way to the engine cylinders gases comprising exhaust gas of the engine and additional air, which gases are at a relatively high temperature for cylinder charges of relatively low quantity and vice versa, introducing the resulting mixture of fuel and gases into an engine cylinder while violently agitating same and the residual gases of a prior cycle, compressing the confined charge material while further violently agitating same, and igniting at such point prior to maximum compression as to secure substantially maximum mean effective pressure without detonation or preignition.

14. The process of charge forming for an internal combustion engine, which comprises supplying a fuel-air mixture relatively deficient in air, and adding direct to said mixture exhaust gas and air at temperatures which are relatively high for relatively small quantity charges of said fuel-air mixture and vice versa.

15. The process of forming charges for combustion in an internal combustion engine, which comprises forming a fuel-air stream relatively deficient in air, throttling said stream on its way to the engine cylinders, forming a mixture of exhaust gas of the engine and additional air, delivering part of said mixture into direct admixture with the fuel and air stream substantially immediately after it has passed the throttling point, delivering the remainder of said mixture into direct admixture therewith at a plurality of points located closer to the engine cylinders, and regulating delivery to the several points of the plurality so as to compensate for irregularities of distribution to the engine cylinders.

16. The process of forming charges for combustion in an internal combustion engine throughout its range of compression pressures, which comprises mixing fuel with an air stream, throttling the fuel and air stream on its way to the engine cylinders, admixing exhaust gas of the engine and additional air directly with the fuel and air stream after it has passed the point of throttling, and, adjunctively to throttling metering the exhaust gas and additional air and controlling the charge temperatures so that same are relatively high for low compression pressures and relatively low for high compression pressures.

17. The process of forming charges for internal combustion engines, which comprises admixing fuel with the air stream, and controlling the passage of the fuel and air to the engine cylinders to vary the compression pressures, metering exhaust gas and additional air in accordance with the compression pressures, mixing the metered exhaust gas and air together, and then delivering the mixture of the relatively metered gases into the fuel and air stream beyond the point of control thereof.

18. The process of forming charges for internal combustion engines, which comprises admixing fuel with the air stream, and controlling the passage of the fuel and air to the engine cylinders to vary the compression pressure, separately metering exhaust gas and additional air adjunctively to the control of the fuel and air stream to supply both exhaust gas and additional air in accordance with the compression pressures coextensively with the range thereof, and then delivering the separately metered gases into the fuel and air stream beyond the point of control thereof.

19. The process of preparing charges for combustion in internal combustion engines throughout their range of compression pressures, which comprises delivering fuel and air to the engine cylinders and controlling said compression pressure, delivering exhaust gas of the engine and additional air into direct admixture with said fuel and air beyond the point of compression pressure control, and metering the exhaust gas and additional air while supplying during the lower ranges of compression pressure heat sufficient to degasify the fuel and to raise the charge temperature to a point below self-ignition upon compression, and, during the higher ranges of compression pressure, aspirating cold air with the exhaust gas, and thereby reducing the heat supply sufficiently to avoid substantial loss of volumetric efficiency.

20. The process of forming charges for internal combustion engines, which comprises delivering fuel and air to the engine cylinders and controlling the compression pressure therein, preheating additional air by transfer of heat thereto from the exhaust gas stream, separately metering said preheated air and exhaust gas, and then delivering said preheated air and said exhaust gas into admixture with the main fuel and air entering the engine cylinders.

21. In the process of preparing charges for combustion in an internal combustion engine, the steps of producing a flow of a mixture of air and volatile liquid fuel, passing exhaust gas into the fuel and air stream at a point having a pressure substantially the same as the cylinder pressure on the intake stroke, and utilizing the kinetic energy of said exhaust gas to inject cold air into said fuel and air stream along with the exhaust gas cooled by said air.

22. In the process of preparing charges for combustion in an internal combustion engine, the steps of producing a flow of a mixture of air and volatile liquid fuel, passing exhaust gas to the fuel and air stream at a point having a pressure substantially the same as the cylinder pressure on the intake stroke, maintaining the temperature of the exhaust gas high without material reduction during one range of depression of cylinder pressure, and utilizing the kinetic energy of flow of the exhaust gas during the remaining range of depression of cylinder pressure for injecting cold air along the exhaust gas cooled by said air into the fuel and air stream.

23. The process of preparing charges for combustion in an internal combustion engine, which consists in producing a flow of a mixture of air and volatile liquid fuel increased in quantity with increasing power demand on the engine, producing a flow of a mixture of exhaust gas and air delivered into the first flow at a point having a pressure substantially the same as the cylinder pressure on the intake stroke, and utilizing the exhaust gas to inject the air at and beyond a given increase in the power demand on the engine.

24. Process according to claim 23, in which more air and exhaust gas are delivered when the intake depression is relatively small than when the intake depression is relatively great.

25. Process according to claim 23, in which hot exhaust gas and hot air are delivered when the intake depression is relatively great.

26. Process according to claim 23, in which the exhaust gas and air injected thereby when the intake depression is relatively small are relatively cool.

27. The process of preparing charges for combustion in an internal combustion engine which consists of producing a flow of a mixture of air and volatile liquid fuel increased in quantity with increasing power demand on the engine, producing a flow of exhaust gas and air delivered into admixture with the fuel and air flow at a point having a pressure substantially the same as the cylinder pressure on the intake stroke, taking the air of the added flow during low demands on engine power from a source of preheated air and taking the air of the added flow during greater demands on engine power from a source of cooler air.

In testimony whereof, I have signed my name hereto.

ARLINGTON MOORE.